(12) United States Patent
Choi

(10) Patent No.: US 9,156,355 B2
(45) Date of Patent: Oct. 13, 2015

(54) METHOD AND APPARATUS FOR DISPLAYING ENERGY FLOW IN HYBRID VEHICLE

(71) Applicant: Hyundai Mobis Co., Ltd., Seoul (KR)

(72) Inventor: Min Jae Choi, Yongin-si (KR)

(73) Assignee: Hyundai Mobis Co., Ltd., Yongin-si (KR)

( * ) Notice: Subject to any disclaimer, the term of this patent is extended or adjusted under 35 U.S.C. 154(b) by 183 days.

(21) Appl. No.: 13/869,297

(22) Filed: Apr. 24, 2013

(65) Prior Publication Data

US 2013/0278404 A1  Oct. 24, 2013

(30) Foreign Application Priority Data

Apr. 24, 2012 (KR) .................. 10-2012-0042830

(51) Int. Cl.
  *B60Q 1/00* (2006.01)
  *B60K 37/02* (2006.01)
  *B60K 35/00* (2006.01)
  *B60K 6/00* (2007.10)
  *B60W 20/00* (2006.01)

(52) U.S. Cl.
  CPC .................. *B60K 37/02* (2013.01); *B60K 35/00* (2013.01); *B60W 20/50* (2013.01); *B60K 6/00* (2013.01); *B60W 20/00* (2013.01); *B60Y 2400/92* (2013.01)

(58) Field of Classification Search
  CPC .......... B60K 37/02; B60K 6/20; B60K 35/00; B60K 6/00; B60Y 2200/90; B60W 20/50; B60W 20/00
  USPC .................. 340/438, 461; 180/65.21; 701/22; 345/418, 7
  See application file for complete search history.

(56) References Cited

U.S. PATENT DOCUMENTS

| | | | | |
|---|---|---|---|---|
| 8,207,841 B2 * | 6/2012 | Watson et al. | ................ | 340/462 |
| 8,294,562 B2 * | 10/2012 | Gohring et al. | ................ | 340/439 |
| 8,483,907 B2 * | 7/2013 | Tarte | ................ | 701/36 |
| 8,860,565 B2 * | 10/2014 | Skaff et al. | ................ | 340/439 |
| 2009/0174538 A1 * | 7/2009 | Shibata et al. | ................ | 340/438 |
| 2010/0057281 A1 * | 3/2010 | Lawyer et al. | ................ | 701/22 |
| 2010/0265050 A1 * | 10/2010 | Skaff et al. | ................ | 340/438 |
| 2010/0305795 A1 * | 12/2010 | Kuang et al. | ................ | 701/22 |
| 2011/0192666 A1 * | 8/2011 | Schmid et al. | ................ | 180/165 |
| 2012/0179313 A1 * | 7/2012 | Hartl et al. | ................ | 701/22 |

\* cited by examiner

*Primary Examiner* — Eric M Blount
(74) *Attorney, Agent, or Firm* — NSIP Law

(57) ABSTRACT

Provided are a method and apparatus for displaying energy flow in a hybrid vehicle. The present invention adds a function, which displays breakdown and abnormal state information on modules and is not provided by an energy flow displaying function of the existing hybrid vehicle, to the energy flow displaying function, thus removing inconvenience of the existing energy flow displaying function that cannot check information on breakdown and abnormal states of a vehicle.

9 Claims, 5 Drawing Sheets

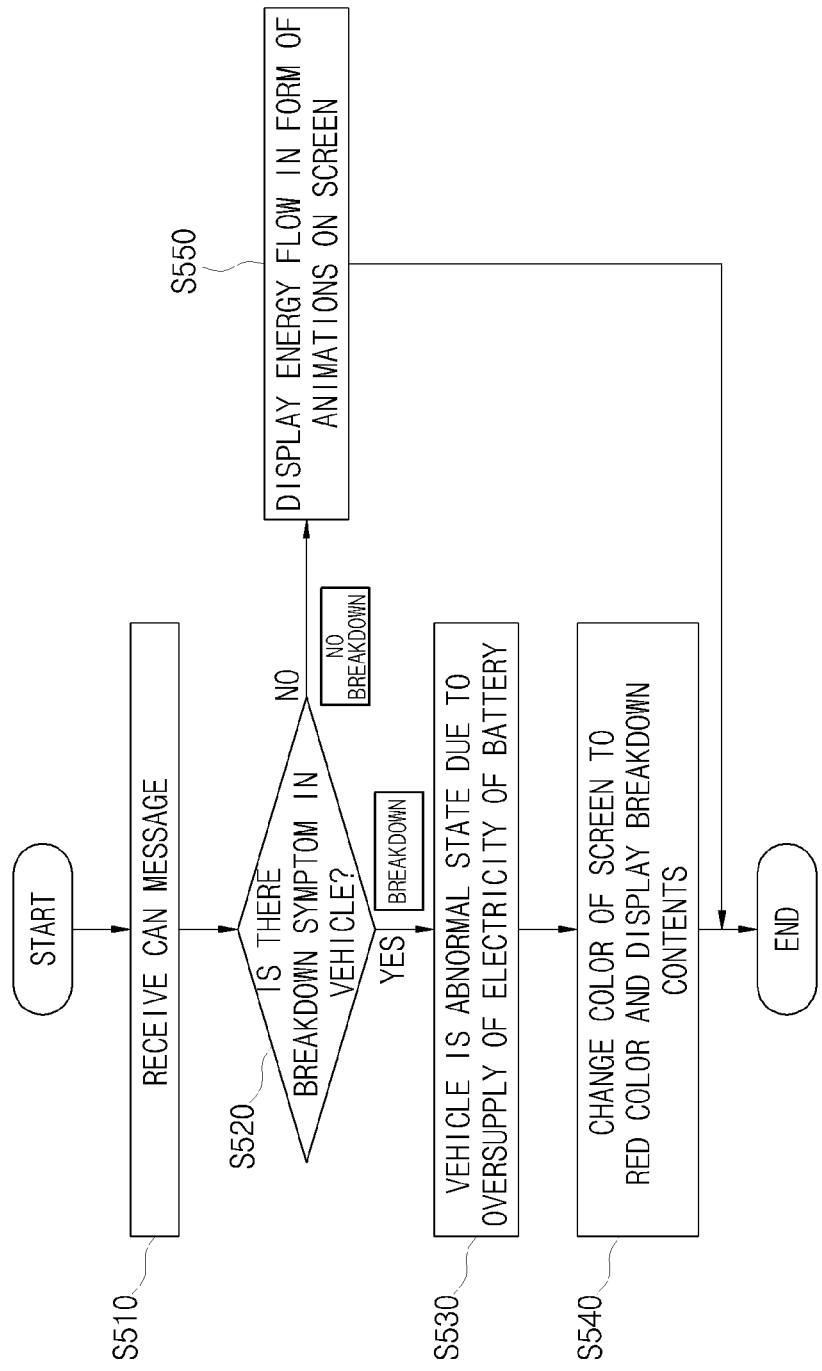

METHOD AND APPARATUS FOR DISPLAYING ENERGY FLOW IN HYBRID VEHICLE

CROSS-REFERENCE TO RELATED APPLICATIONS

This application claims priority under 35 U.S.C. §119 to Korean Patent Application No. 10-2012-0042830, filed on Apr. 24, 2012, the disclosure of which is incorporated herein by reference in its entirety.

TECHNICAL FIELD

The present invention relates to a method and apparatus for displaying energy flow in a hybrid vehicle, and more particularly, to a method and apparatus for displaying energy flow in a hybrid vehicle, which display energy flow between modules of a hybrid vehicle.

BACKGROUND

The supply of hybrid vehicles, which include both a combustion engine and a battery engine of an electric vehicle to considerably improve fuel efficiency and reduce the amount of noxious gases emitted compared to the existing vehicles, is recently increasing.

Presently-developed hybrid vehicles provide an energy (or power) flow displaying screen that shows a flow of energy circulating between modules of each of the hybrid vehicles in the form of animations so as to take a glance, for aiding a driver's economical driving.

The energy flow displaying screen displays an engine module, a motor module, a battery module, and energy flow lines connecting therebetween in the form of animations, and visually provides an energy flow state through graphics processing such as changing the colors or shapes of the energy flow lines.

However, the related art energy flow displaying screen displays only an energy flow state, and cannot realize a function that displays the breakdowns and abnormal states of respective modules.

For example, if the function of displaying the breakdowns and abnormal states of respective modules is added to the related art energy flow displaying screen, a driver can easily recognize information on the breakdown and abnormal state of a vehicle, and thus can economically drive the vehicle and moreover prepare for the breakdown and abnormal state of the vehicle.

However, the function in which the energy flow displaying screen displays visual information on the breakdown and abnormal state of a vehicle is not yet implemented.

SUMMARY

Accordingly, the present invention provides a method of displaying energy flow in a hybrid vehicle, which displays a breakdown and abnormal state of the hybrid vehicle on an energy flow displaying screen provided by the hybrid vehicle.

The present invention also provides an energy flow displaying apparatus using the display method.

In one general aspect, an apparatus for displaying energy flow in a hybrid vehicle including an engine module, a motor module, a battery module, and a vehicle driving wheel module, in which power shift between the modules is displayed in the form of graphics, includes: a graphics controller graphics-processing the respective modules into icons, receiving power shift information and breakdown state information from the respective modules, processing the power shift information into a line type of graphics indicating power shift between corresponding icons, and processing the breakdown state information into a text type of graphics indicating the breakdown state of each of the modules; and a display unit simultaneously displaying the icons, the line type of graphics, and the text type of graphics on one screen according to control by the graphics controller.

In another general aspect, a method of displaying energy flow in a hybrid vehicle that includes an engine module, a motor module, a battery module, and a vehicle driving wheel module, and includes a head unit including a graphics controller processing power shift between the modules in the form of graphics and a display unit displaying the power shift as graphics according to control by the graphics controller, includes: graphics-processing, by the graphics controller, the respective modules into predetermined icons; processing, by the graphics controller, power shift between corresponding icons into a line type of graphics on the basis of power shift information between the modules; receiving, by the graphics controller, breakdown state information from the respective modules, and processing a breakdown state of each of the modules into a text type of graphics on the basis of the received breakdown state information; and simultaneously displaying, by the display unit, the icons, the line type of graphics, and the text type of graphics on one screen according to control by the graphics controller.

Other features and aspects will be apparent from the following detailed description, the drawings, and the claims.

BRIEF DESCRIPTION OF THE DRAWINGS

FIG. 5 is a flowchart illustrating a method of displaying energy flow in a hybrid vehicle according to an embodiment of the present invention.

DETAILED DESCRIPTION OF EMBODIMENTS

Figure 1:
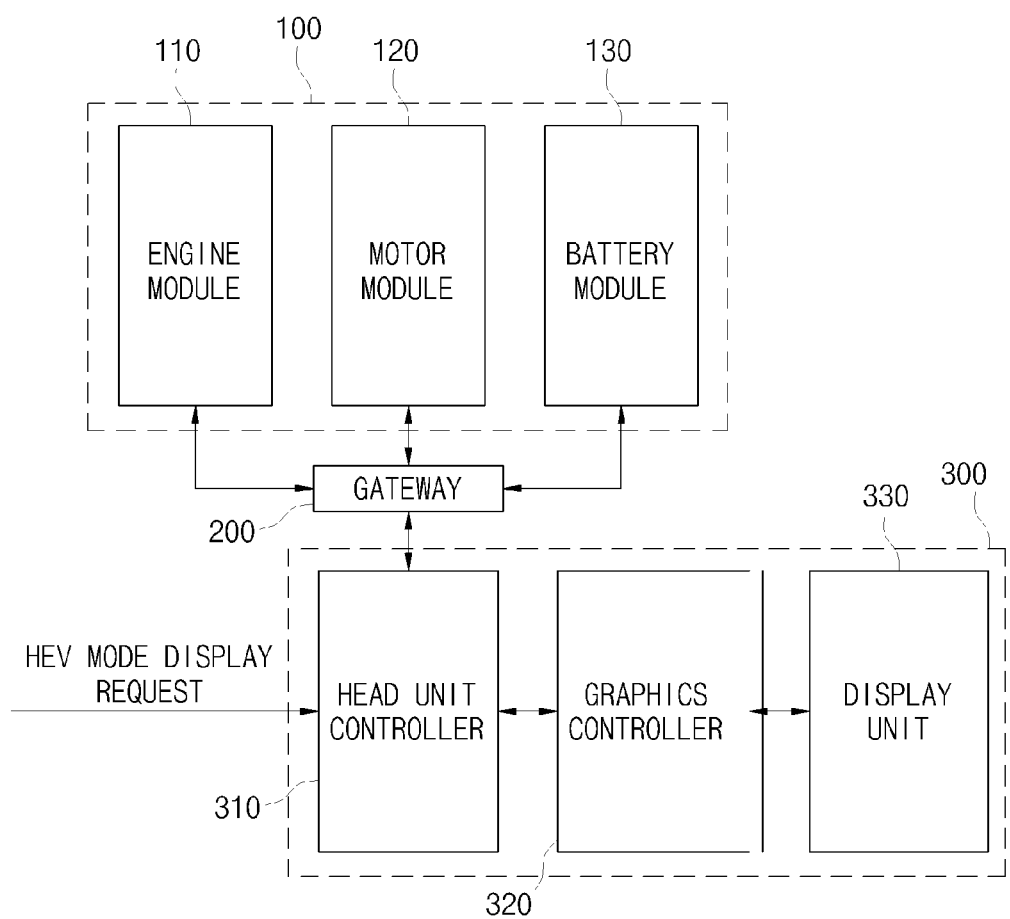
FIG. 1 is a block diagram illustrating an entire system according to an embodiment of the present invention.

Exemplary embodiments of the present invention capable of being easily embodied by those skilled in the art will now be described in detail with reference to the accompanying drawings. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout.

In this disclosure below, when it is described that one comprises (or includes or has) some elements, it should be understood that it may comprise (or include or has) only those elements, or it may comprise (or include or have) other elements as well as those elements if there is no specific limitation. Moreover, each of terms such as " . . . unit", " . . . part" and "apparatus" described in specification denotes an element for performing at least one function or operation, and may be implemented in hardware, software or the combination of hardware and software.

FIG. 1 is a block diagram illustrating an entire system according to an embodiment of the present invention.

Referring to FIG. 1, the entire system according to an embodiment of the present invention includes a plurality of elements 100 configuring a hybrid vehicle and a hybrid head unit (hereinafter referred to as "head unit") 300 that receives energy flow information (hereinafter referred to as "power shift information") from the elements 100, and provides an energy flow state (or power shift state) between the elements 100 to a user in the form of visual information.

The elements 100 may include a combustion engine, an electric mechanic element, an energy storage unit, and a vehicle driving wheel. The combustion engine (i.e., engine) outputs power, and may include an engine module 110 that controls a power output of the combustion engine. The engine module 110 electronically controls an overall operation of the engine, and especially, provides engine power shift information indicating a power shift state of the engine and breakdown state information indicating a breakdown state of the engine to the head unit 300, for providing the power shift state and breakdown state of the engine to the user. The electric mechanic element may be a motor (or dynamo), and may include a motor module 110 that controls the motor. The motor module 110 controls an overall operation of the motor, and especially, provides motor power shift information indicating a power shift state of the motor and breakdown state information on the motor to the head unit 300, for providing the power shift state and breakdown state of the motor to the user. The energy storage unit may be a high voltage battery (hereinafter referred to as "battery") that outputs power for driving the motor, and may include a battery module 130 that controls an overall operation of the battery. In particular, the battery module 130 provides battery power shift information indicating a power shift state of the battery and breakdown state information on the battery to the head unit 300, for providing the power shift state and breakdown state of the battery to the user.

The head unit 300 receives the above-described power shift information and breakdown state information from the respective modules 110, 120, and 130, and provides power shift (or energy flow) between corresponding elements (between the engine and the motor, between the motor and the battery, between the engine and the vehicle driving wheel, or between the vehicle driving wheel and the motor) to a user as an animation type of visual information. Also, the head unit 300 provides even an animation type of visual information corresponding to a breakdown state of each of the modules, in addition to the energy flow, to the user.

The head unit 300 receives power shift information as controller area network (CAN) messages from the respective modules 110, 120, and 130 through CAN communication designed in the vehicle, and particularly, breakdown state information transferred through the CAN communication also is a predefined value and is used to recognize a breakdown state. In order to transfer the CAN messages, a gateway 200 relaying the transfer of the CAN messages is installed between the modules and the head unit 200. The head unit 200 receives power shift information and breakdown state information in real time through multimedia-control area network (MM-CAN) communication.

The head unit 300 may include a head unit controller 310, a graphics controller 320, and a display unit 330, for providing an animation type of visual information as described above.

The head unit controller 310, although not shown, is an element that controls overall operations of the graphics controller 320 and display unit 330 of the head unit 300, and indicates a graphics display operation for power shift to the graphics controller 320 in response to a user's request for power shift information. In the embodiment, a generic name for the user's request for power shift information is called "HEV mode display request". Here, the HEV mode display request is a message used to determine whether to activate an HEV mode that shows information on power shift (or energy flow) and breakdown states in the form of animations, and is transferred from the user to the head unit 310. That is, whether to activate a display mode (HEV mode) for energy flow may be determined by the user's selection. Alternatively, the display mode may be activated simultaneously with the start of driving of the vehicle, irrespective of the user's selection.

The graphics controller 320 starts a graphics operation for showing information on power shift and breakdown states to the user according to the HEV mode display request from the head unit controller 310. The graphics controller 320 is a processor that receives graphics commands, analyzes the graphics commands, and transfers a signal to a screen. The graphics controller 320 recognizes power shift information and breakdown state information, provided from the head unit controller 310, as the graphics commands, and analyzes the graphics commands to display an energy flowchart for power shift, which will be described below in detail, on a screen. In more detail, the graphics controller 320 performs an operation that graphics-processes the modules into icons, receives power shift information and breakdown state information from the modules, processes the power shift information into a line type of graphics indicating power shift between corresponding icons, and processes the breakdown state information into a text type of graphics indicating the breakdown state of each of the modules.

The display unit 330 simultaneously displays the icons, the line type of graphics, and the text type of graphics on one screen according to control by the graphics controller 320.

Hereinafter, a power shift screen (or energy flow screen) on which the display unit 330 of the head unit 300 according to an embodiment of the present invention displays power shift and breakdown states will be described.

Figure 2:
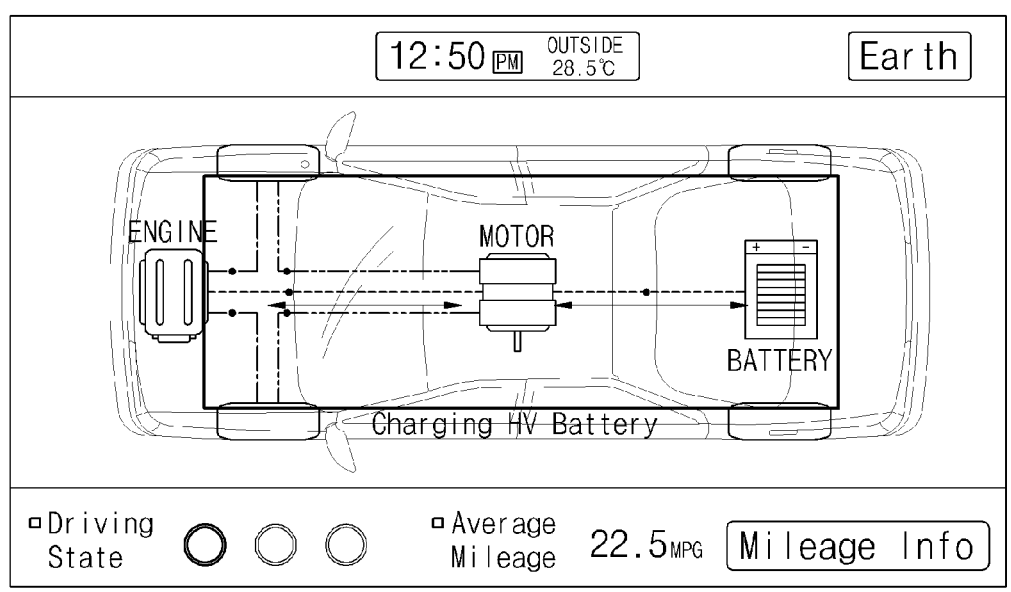
FIG. 2 is a screen showing a power shift (or energy flow) state displayed by a display unit of FIG. 1.

FIG. 2 is a screen showing a power shift (or energy flow) state displayed by the display unit of FIG. 1.

Referring to FIG. 2, the power shift screen displays an engine icon, a motor icon, a battery icon, and a vehicle driving wheel icon that are graphics-processed by the graphics controller 320 of FIG. 1. The respective icons indicate the engine module, the motor module, the battery module, and the vehicle driving wheel module. Also, each of the engine icon, motor icon, and battery icon is graphics-processed to have a separate letter mark and type indicating what each icon shows.

Power shift between the icons is processed as a line type of graphics. Specifically, as illustrated in FIG. 2, power shift between the engine icon and a front vehicle driving wheel icon is processed as a line type of graphics having a white color, and power shift between the front vehicle driving wheel icon and the motor icon is processed as a line type of graphics having a blue color. Power shift between the engine icon and the motor icon is processed as a line type of graphics having a green color, and power shift between the motor icon and the battery icon is also processed as a line type of graphics having a green color.

When there is no power shift between the icons, a corresponding line is processed to be displayed as a line from which a predetermined color is removed. For example, when there is power shift between the icons, a corresponding line is changed to a line of a predetermined color, which enables a user to easily and visually recognize power shift (i.e., energy flow) between corresponding modules.

Figure 3:
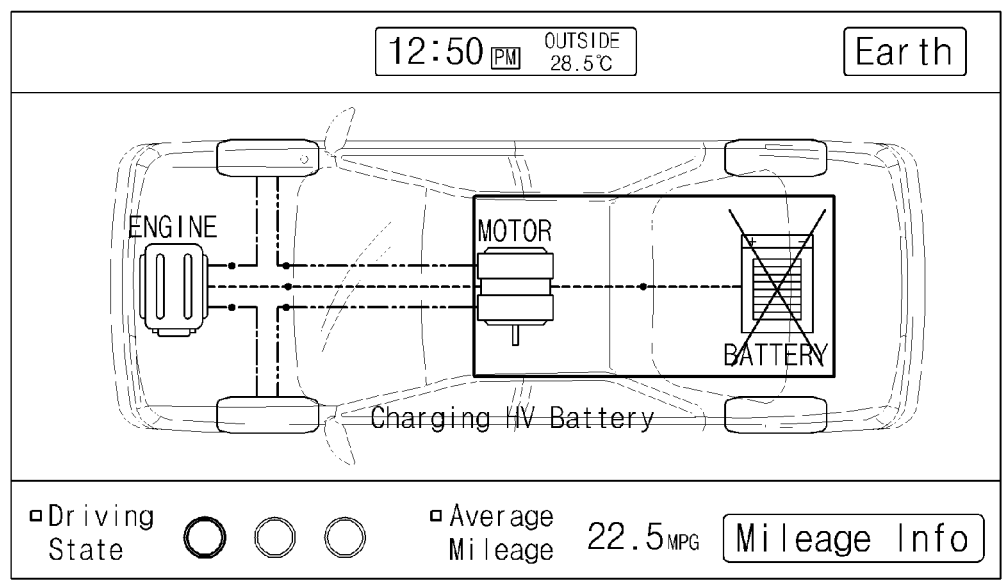
FIGS. 3 and 4 are screens showing a breakdown state of a specific module together on the power shift screen of FIG. 2.
Figure 4:
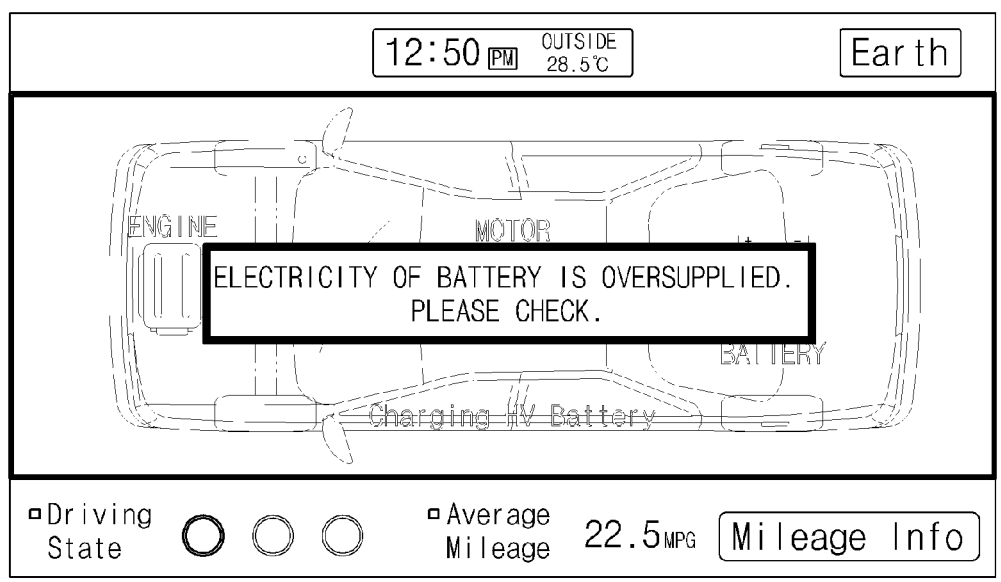

FIGS. 3 and 4 are screens showing a breakdown state of a specific module together on the power shift screen of FIG. 2.

Referring to FIG. 3, first, when there are a breakdown of the battery and communication not possible between the battery and the motor, on the basis of breakdown state information received from the battery module and the motor module, the head unit 300 displays the breakdown states on the power shift screen. While the hybrid vehicle is driving, when communication is not performed between the motor and the battery due to a breakdown of the battery, the head unit 300 defines a message and value for determining a kind of the breakdown, receives breakdown state information from the battery module of the vehicle, and displays breakdown information on the battery module on the basis of a value of a CAN message corresponding to the received breakdown state information. For example, as illustrated in FIG. 3, the head unit 300 generates a box line surrounding the motor icon and battery icon that are not communicated there between, and overlaps a cross type of sign, such as "' '", with the motor icon, thereby displaying a breakdown of the motor module.

When the battery is broken down and communication between the battery and the motor is impossible, a CAN message, a signal, and a value that are received by the head unit 300 may be defined as follows.

TABLE 1

| |
|---|
| Defined CAN message: DATC__HEV__PE03 |
| Signal: CR__Hcu__Hev__ERR__BAT |
| Value 0: normal |
| Value 1: low electricity |
| Value 2: zero-electricity |
| Value 3: supply of electricity not possible |
| Value 4: oversupply of electricity |

Referring to FIG. 4, when power (or electricity) of the battery is oversupplied, as illustrated, the head unit 300 changes a portion of a screen to a screen of a specific color such as a red color, and displays a warning phrase, such as "Electricity of battery is oversupplied. Please check.", on the center of the screen.

When power (or electricity) of the battery is oversupplied, a CAN message, a signal, and a value that are received by the head unit 300 may be defined as follows.

TABLE 2

| |
|---|
| Defined CAN message: DATC__HEV__PE03 |
| Signal: CR__Hcu__Hev__ERR__BAT |
| Value 4: oversupply of electricity |

That is, when four CAN messages are transferred to the head unit 300, the head unit 300 changes a screen to a screen of a red color, and displays a warning phrase corresponding to a corresponding value.

FIG. 5 is a flowchart illustrating a method of displaying energy flow in the hybrid vehicle according to an embodiment of the present invention.

Referring to FIG. 5, when the hybrid vehicle starts to drive, the head unit receives CAN messages including power shift information from the respective modules, in operation S510.

Subsequently, the head unit controller of the head unit analyzes the CAN messages to determine whether the modules are broken down and are abnormal, in operation S520. That is, the head unit controller determines whether the respective CAN messages include breakdown state information on the modules, and, when the respective CAN messages include the breakdown state information, the head unit controller determines a module having a breakdown symptom and a kind of the breakdown according to a predefined rule.

When it is determined that electricity of the battery is oversupplied in operation S530, as shown in FIG. 4, the head unit changes a screen to a screen of a red color, and displays breakdown contents in the form of letters on the screen, in operation S540.

When it is determined in operation S520 that there are no breakdown and abnormality, namely, when the CAN messages include only power shift information without including breakdown state information, the head unit displays energy flow based on the power shift information in the form of animations on a screen, in operation S550.

According to the present invention, the function of displaying a breakdown state of a hybrid vehicle is added to the energy flow displaying function of the hybrid vehicle, thus enabling safe driving as well as economical driving.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for displaying energy flow in a hybrid vehicle including an engine module, a motor module, a battery module, and a vehicle driving wheel module, in which power shift between the modules is displayed in the form of graphics, the apparatus comprising:
a head unit controller analyzing messages received from the respective modules, and determining whether the messages comprise power shift information or breakdown state information;
a graphics controller graphics-processing the respective modules into icons, processing the power shift information into a line type of graphics indicating power shift between corresponding icons, if it is determined that the messages comprise the power shift information, or processing the breakdown state information into a text type of graphics indicating the breakdown state of each of the modules, if it is determined that the messages comprise the breakdown state information.

2. The apparatus of claim 1, wherein the graphics controller processes the breakdown state information into graphics of a specific color.

3. The apparatus of claim 2, further comprising a display unit simultaneously displaying the icons, the line type of graphics, and the text type of graphics on one screen according to control by the graphics contoller,
wherein the display unit changes a color of the screen to the specific color and displays the text type of graphics according to control by the graphics controller.

4. The apparatus of claim 1, wherein the graphics controller receives the breakdown state information through CAN communication.

5. The apparatus of claim 4, wherein the received breakdown state information comprises information, indicating a broken-down module, and information indicating a kind of breakdown of the broken-down module.

6. The apparatus of claim 5, wherein the kind of breakdown is a state in which power from the broken-down module is abnormally supplied.

7. The apparatus of claim 6, wherein the display unit displays the abnormal supply state as letters.

8. A method of displaying energy flow in a hybrid vehicle that includes an engine module, a motor module, a battery module, and a vehicle driving wheel module, and includes a head unit including a graphics controller processing power shift between the modules in the form of graphics and a head unit controller analyzing messages received from the respective modules, the method comprising:
- analyzing, by the head unit controller, the messages received from the respective modules, and determining whether the messages comprise power shift information of breakdown state information;
- graphics-processing, by the graphics controller, the respective modules into predetermined icons;
- processing, by the graphics controller, power shift between corresponding icons into a line type of graphics on the basis of power shift information between the modules, if it is determined that the messages comprise the power shift information;
- processing a breakdown state of each of the modules into a text type of graphics on the basis of the received breakdown state information, if it is determined that the messages comprise the breakdown state information.

9. The method of claim 8, further comprising simultaneously displaying, by a display unit, the icons, the line type of graphics, and the text type of graphics on one screen according to control by the graphics controller, wherein simultaneously displaying the icons, the line type of graphics, and the text type of graphics on one screen comprises processing a color of screen into a specific color prior to processing the text type of graphics.

* * * * *